United States Patent [19]

Sakai et al.

[11] Patent Number: 4,690,011
[45] Date of Patent: Sep. 1, 1987

[54] SELECTOR MECHANISM FOR AN INFINITELY VARIABLE TRANSMISSION

[75] Inventors: Yasuhito Sakai, Higashimurayama; Kenichi Yamada, Mitaka, both of Japan

[73] Assignee: Fuji Jukogyo Kabushiki Kaisha, Tokyo, Japan

[21] Appl. No.: 693,560

[22] Filed: Jan. 23, 1985

[30] Foreign Application Priority Data

Jan. 31, 1984 [JP] Japan .................................. 59-15411

[51] Int. Cl.[4] ........................ B60K 20/12; F16D 67/02
[52] U.S. Cl. .................................. 74/475; 74/473 R; 192/4 A
[58] Field of Search ................... 74/473 R, 475, 337.5, 74/689; 192/4 A

[56] References Cited

U.S. PATENT DOCUMENTS

| 2,003,794 | 6/1935 | Van Pegrift | 74/337.5 X |
| 2,839,941 | 6/1958 | Rugen | 74/337.5 X |
| 3,456,522 | 7/1969 | Bieber | 74/475 |
| 3,601,230 | 8/1971 | Platz | 192/4 A X |
| 3,729,075 | 4/1973 | Piret | 188/69 X |
| 3,912,050 | 10/1975 | Iwanaga et al. | 192/4 A X |
| 4,089,394 | 5/1978 | Haupt et al. | 192/4 A |
| 4,241,618 | 12/1980 | Smirl | 74/689 X |
| 4,310,081 | 1/1982 | Kolacz | 192/4 A |

Primary Examiner—Martin G. Belisario
Attorney, Agent, or Firm—Martin A. Farber

[57] ABSTRACT

A mechanism for the selection of various operational ranges of an infinitely variable belt-drive transmission for a vehicle, the mechanism having a shift lever shiftable along a straight line. The transmission has a drive range and a high engine speed drive range which is provided to downshift the transmission during the drive of the vehicle in the drive range. The mechanism is provided with a cam plate responsive to the operation of the selector lever and having a cam groove for providing the drive range and the high engine speed drive range under the drive range state.

7 Claims, 13 Drawing Figures

SELECTOR MECHANISM FOR AN INFINITELY VARIABLE TRANSMISSION

BACKGROUND OF THE INVENTION

The present invention relates to a selector mechanism for an infinitely variable belt-drive automatic transmission for a vehicle, and particularly to a mechanism for performing the selection of operational ranges of the automatic transmission.

U.S. Pat. No. 4,304,150 discloses an infinitely variable transmission for a vehicle. The transmission comprises an endless belt running over a driving pulley and a driven pulley, each pulley is so designed that the running diameter of the driving belt on the pulley varies by a hydraulic control system. In the system, operational ranges such as a drive range (D), reverse range (R), neutral range (N), and parking range (P) for locking the output shaft of the transmission during parking of the vehicle are provided. In addition, it has proposed to provide a high engine speed drive range (Ds range) in which the transmission is downshifted. Accordingly, in the Ds range, the vehicle is driven in a high engine speed range, which enables sporty driving and active uphill/downhill driving. The selection of these ranges is performed by manipulating a selector lever. It is preferable that the selection is performed by shifting the selector lever along a straight line.

The transmission is so arranged that the D-range is selected by selecting gears in a selector device. On the other hand, the Ds-range is obtained by changing the state of a hydraulic control circuit without changing a D-range gear train. Accordingly, a selector mechanism for selecting the Ds-range must be provided with a mechanism for holding the D-range. In order to meet these requirements, the selector mechanism is apt to be complicated, if a conventional change speed mechanism such as shifter rails and shifter arms is employed.

SUMMARY OF THE INVENTION

Accordingly, an object of the present invention is to provide a mechanism capable of selecting operational ranges in an infinitely variable belt-drive automatic transmission by shifting a selector lever along a straight line.

Another object of the present invention is to provide a mechanism in which a high engine speed drive range (Ds-range) can be selected without affecting the drive range.

A further object of the present invention is to provide a mechanism which is simplified in construction and small in size.

According to the present invention, a selector lever is provided to be shifted along a straight line, for performing the selection of the drive range, Ds range, reverse range, neutral range and parking range of an infinitely variable belt-drive transmission. The mechanism comprises a rotatably shaft operatively connected to the selector lever so as to be rotated by the selector lever, a cam plate secured to the rotatable shaft and having a first portion for the drive range and Ds range, a second portion for the reverse range parking range, and an intermediate portion between the first and second portions, a cam follower following the cam plate to operate a synchronizer of the transmission through a fork, a parking lock mechanism including a cam operatively connected to the rotatable shaft and a locking pawl, which are so arranged that when the parking range is selected, the cam engages with the pawl to engage it with one of the rotatable members of the transmission so as to lock the member. The cam plate has a cam groove and the first and second portions are arcuate portions each having a different diameter, and the first arcuated portion has a portion for the drive range and for the Ds range, whereby the Ds range is selected under the drive range state.

The above and other objects and features of this invention will become understood from the following description with reference to the accompanying drawings.

DETAILED DESCRIPTION OF THE PREFERRED EMBODIMENT

Figure 1A:
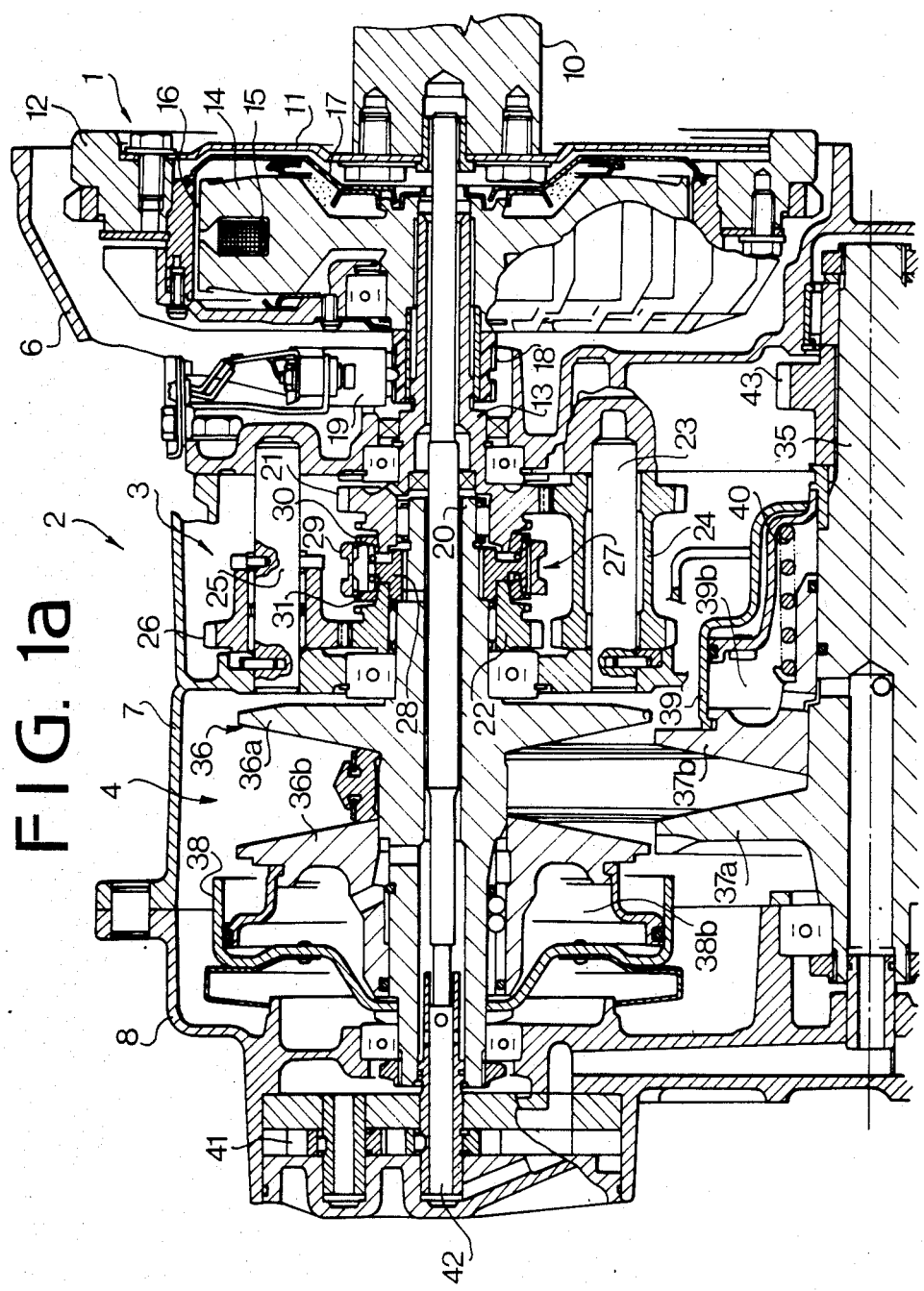
FIGS. 1a and 1b are sectional views of an infinitely variable belt-drive transmission to which the present invention is applied.
Figure 1B:
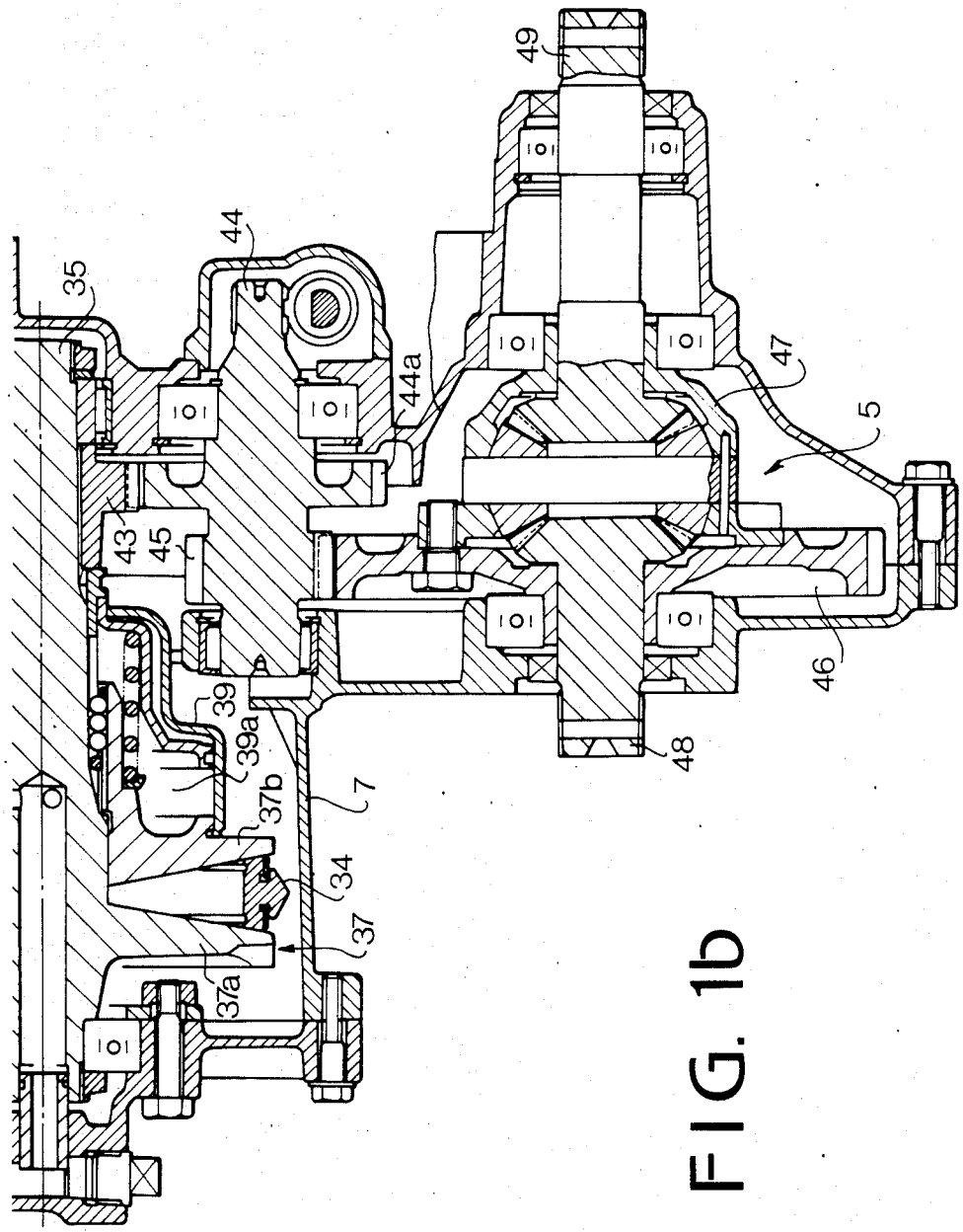

Referring to FIGS. 1a and 1b, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressure oil control circuit (not shown). The electromagnetic powder clutch 1 is provided in a housing 6, and the selector device 3, pulleys and belt device 4 and final reduction device 5 are provided in a main housing 7 and a side housing 8. A crankshaft 10 of an engine (not shown) is connected to an annular drive member 12 through a drive plate 11 of the electromagnetic powder clutch 1. The electromagnetic powder clutch comprises a driven member 14, a magnetizing coil 15 provided in the driven member 14. The driven member 14 has its outer periphery spaced from the inner periphery of the drive member 12 by a gap 16, and a powder chamber 17 is defined between the drive member 12 and driven member 14. Magnetic powder is provided in the powder chamber 17. The driven member 14 is secured to an input shaft 13 of the belt-drive transmission. A holder secured to the driven member 14 carries slip rings 18 which are electrically connected to the coil 15. The coil 15 is supplied through brushes 19 and slip rings 18 with current from a control circuit for the electromagnetic powder clutch.

When the magnetizing coil 15 is excited by the clutch current, the driven member 14 is magnetized to produce a magnetic flux passing through the drive member 12.

The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

In the belt-drive transmission 2, the selector device 3 is provided between the input shaft 13 and a main shaft 20. The main shaft 20 is cylindrical and is disposed coaxially with the input shaft 13. The selector device 3 comprises a drive gear 21 integral with input shaft 13, a reverse driven gear 22 rotatably mounted on the main shaft 20, and a synchronizer 27 mounted on the main shaft 20. The drive gear 21 meshes with one of counter gears 24 rotatably mounted on a shaft 23. Another one of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) of a selector lever (not shown), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a driving position (D range).

When the sleeve 29 is engaged with the gear 22, the input shaft 13 is connected to the main shaft 20 through the gears 21, 24, 26 and 22 and the synchronizer 27 to provide a reverse driving position (R range).

The main shaft 20 has an axial passage in which an oil pump driving shaft 42 connected to crankshaft 10 is mounted. An output shaft 35 is provided in parallel with the main shaft 20. A drive pulley 36 and a driven pulley 37 are mounted on the shafts 20 and 35. A fixed conical disc 36a of the drive pulley 36 is integral with the main shaft 20 and an axially movable conical disc 36b is axially slidably mounted on the main shaft 20. The movable conical disc 36b also slides in a cylinder secured to the main shaft 20 to form a servo device 38. A chamber of the servo device 38 communicates with an oil pump 41 through the pressure oil control circuit. The oil pump 41 is driven by the shaft 42.

A fixed conical disc 37a of the driven pulley 37 is formed on the output shaft 35 opposite the movable disc 36b and a movable conical disc 37b is slidably mounted on the shaft 35 opposite the disc 36a. Movable conical disc 37b has a cylindrical portion in which a piston portion of the output shaft 35 is slidably engaged to form a servo device 39. A chamber 39b of the servo device 39 is communicated with the oil pump 41 through the pressure oil control circuit. A spring 40 is provided to urge the movable conical disc 37b toward the fixed conical disc 37a. A drive belt 34 engages with the drive pulley 36 and the driven pulley 37.

Secured to the output shaft 35 is a drive gear 43 which engages with an intermediate reduction gear 44a on an intermediate shaft 44. An intermediate gear 45 on the shaft 44 engages with a final gear 46. Rotation of the final gear 46 is transmitted to axles 48 and 49 of the vehicle driving wheels through a differential 47.

The pressure oil control circuit is responsive to vehicle speed, engine speed and throttle valve position for controlling the oil from the oil pump 41 to the servo devices 38 and 39 thereby to move the discs 36b and 37b. Thus, the transmission ratio is infinitely changed.

Figure 2A:
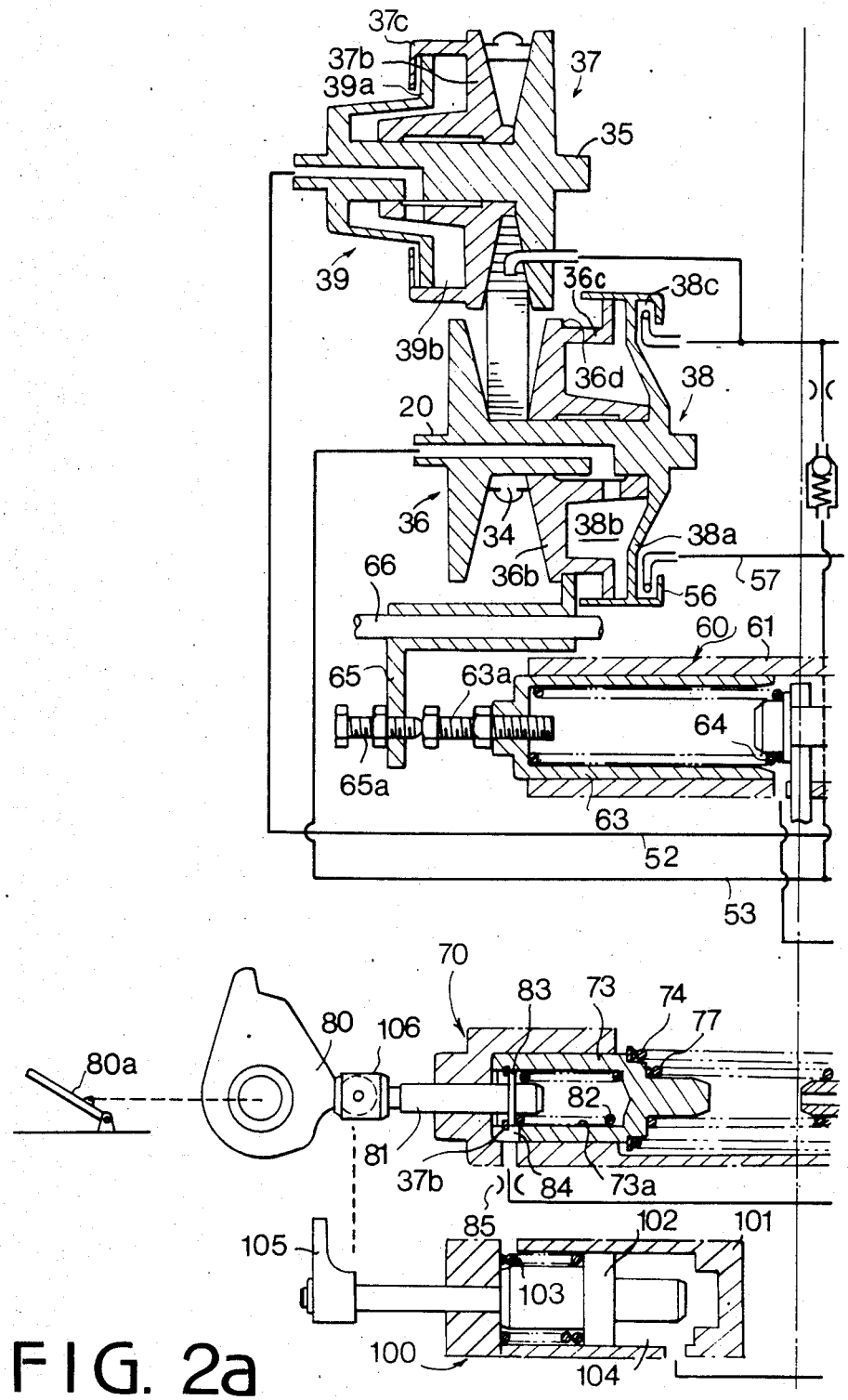
FIGS. 2a and 2b are hydraulic control circuits for the transmission of FIG. 1.
Figure 2B:
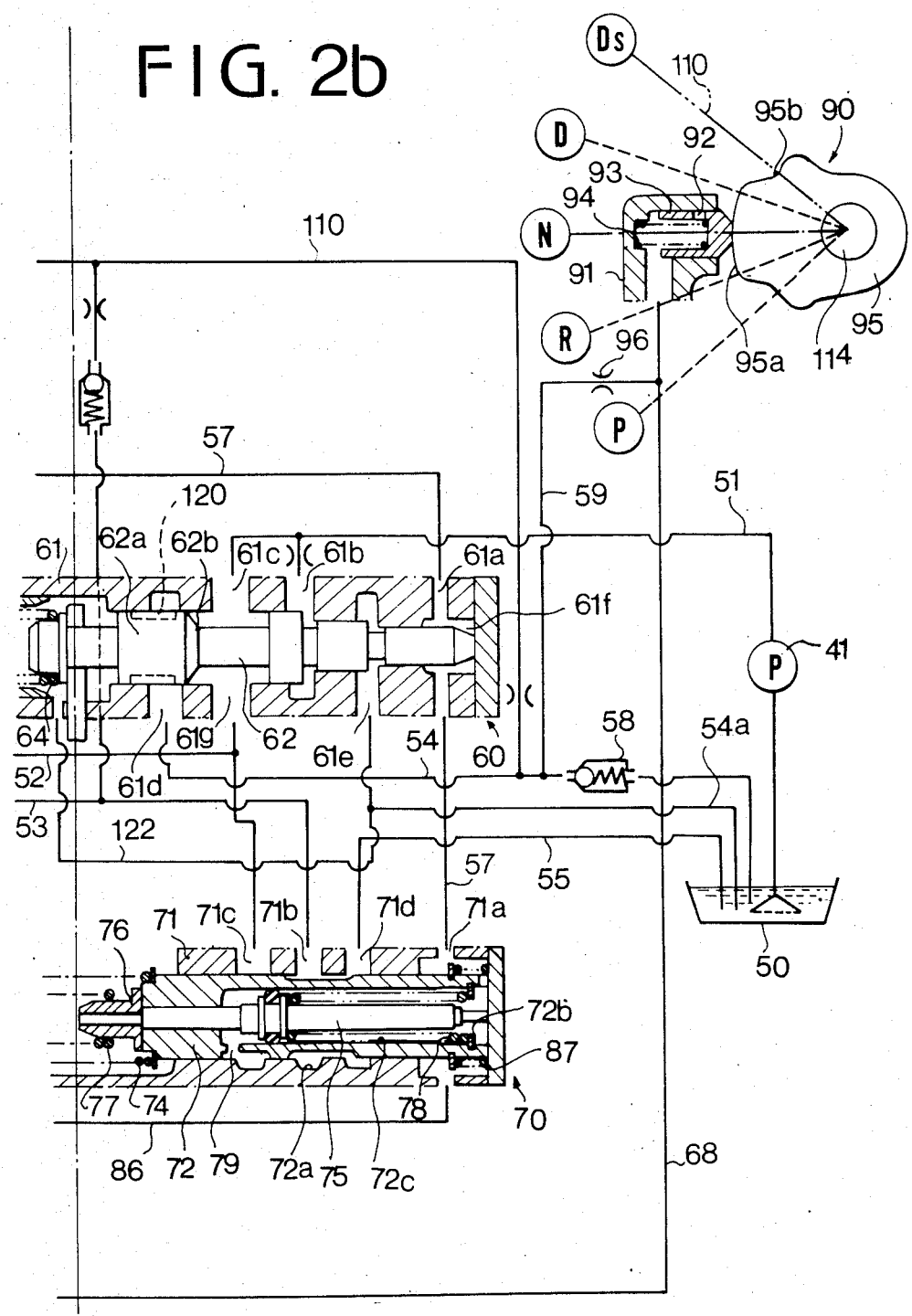

FIGS. 2a and 2b show a hydraulic control circuit. In the servo device 38 of the drive pulley 36, a cylinder 38a integrally formed on the main shaft 20 is engaged with a piston 36c formed on the movable disc 36b, forming a drive pulley servo chamber 38b, into which line pressure is applied. Also, in the other servo device 39 in the driven pulley 37, a cylinder 37c formed integrally with the movable conical disc 37b is engaged with a piston 39a formed on the output shaft 35, forming the driven pulley servo chamber 39b. The movable disc 36b has an area exposed to the line pressure which is larger than the corresponding area of the movable disc 37b. Oil in an oil reservoir 50 is supplied to a pressure regulator valve 60 through a passage 51 by a pump 41. An oil passage 52 from the pressure regulator valve 60 is communicated with the driven pulley servo chamber 39b and also with the drive pulley servo chamber 38b through a transmission ratio control valve 70 and a passage 53. Oil flows back to the oil reservoir 50 through drain passages 54 and 55 which are in communication with the valves 60 and 70, respectively. The drive pulley cylinder 38a has an annular inside groove 38c in which a rotation speed sensor 56 in the form of a pitot tube is provided for measuring the speed of the oil in the groove, that is the speed of the main shaft 20 which varies dependent on the engine speed. The pitot pressure produced by the rotation speed sensor 56 as a pitot tube is applied to the valves 60 and 70 through a passage 57.

A ball check valve 58 is provided in the drain passage 54 for the pressure regulator valve 60, and the passage is communicated with a select position detecting valve 90 upstream of the check valve 58 through a passage 59 and further with an actuator 100 for the transmission ratio control valve 70 through a passage 68.

The pressure regulator valve 60 comprises a valve body 61, a spool 62, a spring 64 provided between a spring retainer 63 and one end of the spool 62 for urging the spool 62 to the right. A sensor shoe 65 for detecting the actual transmission ratio is slidably mounted on a lubricating oil pipe 66 which is parallel with the axis of the spool 62. A bolt 65a secured to an end of the sensor shoe 65 engages with an end of a bolt 63a secured to the spring retainer 63, and the other end of the sensor shoe 65 engages with an outside periphery 36d of the movable disc 36b. Thus, the position of the movable disc 36b which means the transmission ratio during the operation is transmitted to the spool 62 through the spring 64. At the end of the valve body 61, opposite to the spring 64, pitot pressure is applied to an end chamber 61f through the oil passage 57 and a port 61a, and pump oil pressure is applied to a chamber 61b through the passage 51. The passage 51 is communicated with the passage 52 through ports 61c and 61g. A chamber 61d and a chamber 61e, which is provided between the chambers 61f and 61b for preventing the leakage of the oil from affecting the pitot pressure, are communicated with the oil reservoir 50 through drain passages 54 and 54a. The port 61d is communicated with the port 61g through a chamber formed on a land 62a of the spool 62 so that the line pressure can be regulated.

Thus, the spool 62 is applied with the pitot pressure and pump oil pressure so as to be moved in the direction to open the port 61d, whereas the elastic force of the spring corresponding to the transmission ratio detected by the sensor shoe 65 urges the spool 62 in the direction to close the port 61d. Accordingly, high line pressure is produced at the port 61c at a low engine speed with a large transmission ratio. The sensor shoe 65 is moved to the left in FIG. 2 as the transmission ratio decreases, reducing the force of the spring 64 to lower the line pressure. The line pressure act on the belt 34 with a proper force dependent on the transmission ratio so as not to cause the belt to slip on the pulleys.

The transmission ratio control valve 70 comprises a valve body 71, a spool 72, an operating plunger 73, and a spring 74 provided between the spool 72 and the plunger 73. A chamber 71a is communicated with the passage 57 to be applied with the pitot pressure through the pressure regulator valve 60. The control valve 70 further comprises a port 71b communicated with passage 53, a port 71c communicated with the passage 52, a port 71d communicated with the passage 55, and an annular groove 72a formed on the spool 72 so as to communicate the ports 71b and 71c or 71b and 71d for supplying or discharging line pressure to or from the main pulley servo chamber 38b in dependency on the position of the spool 72. A regulator spring 77 is provided between the operating plunger 73 and a retainer 76 securely mounted on a projecting end of a regulator plunger 75 which is slidably provided in an axial cavity 72c in the spool 72. A spring 78 is provided between a flange of the plunger 75 and a retainer 72b of the spool 72. The force of the regulator spring 77 is determined by the projecting extent of the plunger 75 from the spool 72 and the position of the plunger 75 is dependent on the line pressure at the port 71c which is supplied to the inside of the spool 72 through a small aperture 79.

The plunger 73 is slidably mounted in the valve body 71 and has an axial cavity 73a. A rod 81 is axially slidably mounted in the valve body 71, and a flange 83 of the rod 81 is slidably engaged with the wall of the cavity 73a. A small spring 82 is provided between the flange 83 and the plunger 73, and the flange 83 engages with a stopper 73b secured to the plunger. The cavity 73a is applied with the pitot pressure through a port 84 and a passage 86 having an orifice 85 and is communicated with the chamber 71a. A spring 87 is provided between an end of the spool 72 and the valve body 71 to adjust the load on the spring 82. An end of the rod 81 engages with a cam 80 which is operatively connected to an accelerator pedal 80a of the vehicle so as to be rotated in dependency on the depression of the pedal.

When the spool 72 is moved by the pitot pressure to communicate the port 71b with port 71c, the line pressure is applied to the servo chamber 38b of the drive pulley 36 to upshift the transmission. On the other hand, when the port 71b communicates with the port 71d, the chamber 38b is drained to Ds.

The select position detecting valve 90 comprises a valve body 91, a valve 93 having a drain aperture 92 which is slidably mounted in the valve body 91, and a spring 94 for urging the valve 93 toward a cam 95 which rotates according to the position of a selector lever 110. The cam 95 has a lobe 95a corresponding to the D, N, R range positions, and indentations 95b formed in the both sides of the lobe 95a, corresponding to the P, Ds range positions. At the D, N, R range positions, the lobe 95 pushes the valve 93 in the direction to close the drain aperture 92, so that actuating oil pressure is built up. At the P range, and high engine speed drive range (Ds range) positions, the valve 93 moves outwards to open the drain aperture 92, so that the lubricating oil pressure in the passages 54, 59 is lowered. At that time the oil pressure decreases gradually, because of an orifice 95 provided in the oil passage 59.

The actuator 100 comprises a cylinder 101, a piston 102 which is slidably mounted in the cylinder 101, and a spring 103 for urging the piston 102 toward a piston chamber 104 to which actuating oil pressure is applied through the passage 68. Further, a hook portion 105 formed at the outer end of the piston is engageable with a pin 106 on the rod 81 of the transmission ratio control valve 70. At the P range or Ds range, since no actuating oil pressure exists, piston 102 presses the rod 81 to the right in FIG. 2a, 2b controlling the transmission zone to the side of high engine revolution. Thus, releasing of the acceleration pedal at the Ds range causes the Ds range of the transmission, so that the engine braking effects.

In operation of the system, while the vehicle is at a stop, the secondary pulley servo chamber 39b is supplied with the line pressure adjusted by the pressure regulator valve 60 through the passages 51, 52, and the main pulley servo chamber 38b is drained, since the spool 72 is at the right end position by the spring 74. Thus, in the pulley and belt device 4 of the infinitely variable belt-drive transmission 2, the driving belt 34 engages with the driven pulley 37 at a maximum running diameter to provide the largest transmission ratio (low speed stage). When the D range is selected, the input shaft 35 and the main shaft 20 are connected to each other in the selector device 3 by the selector lever. When the acceleration pedal is depressed, the electromagnetic powder clutch 1 is excited by clutch current, transmitting the engine power to the drive pulley 36. The power of the engine is transmitted to the output shaft 35 at the largest transmission ratio by the driving belt 34 and driven pulley 37, and further transmitted to the axles of the driving wheels through the final reduction device 5. Thus, the vehicle is started.

Figure 3:
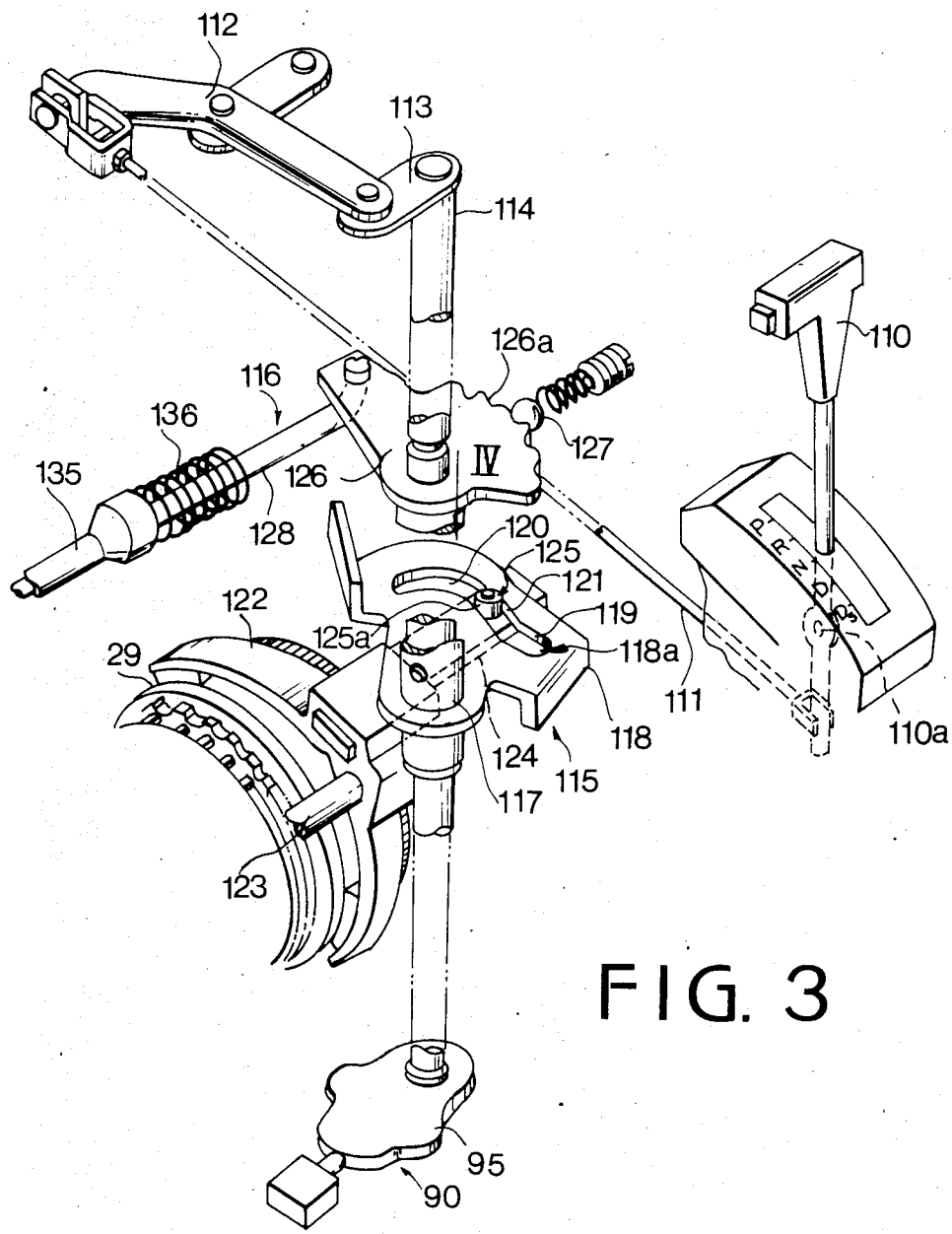
FIG. 3 is a perspective view showing a main part of the mechanism to the present invention.
Figure 4:
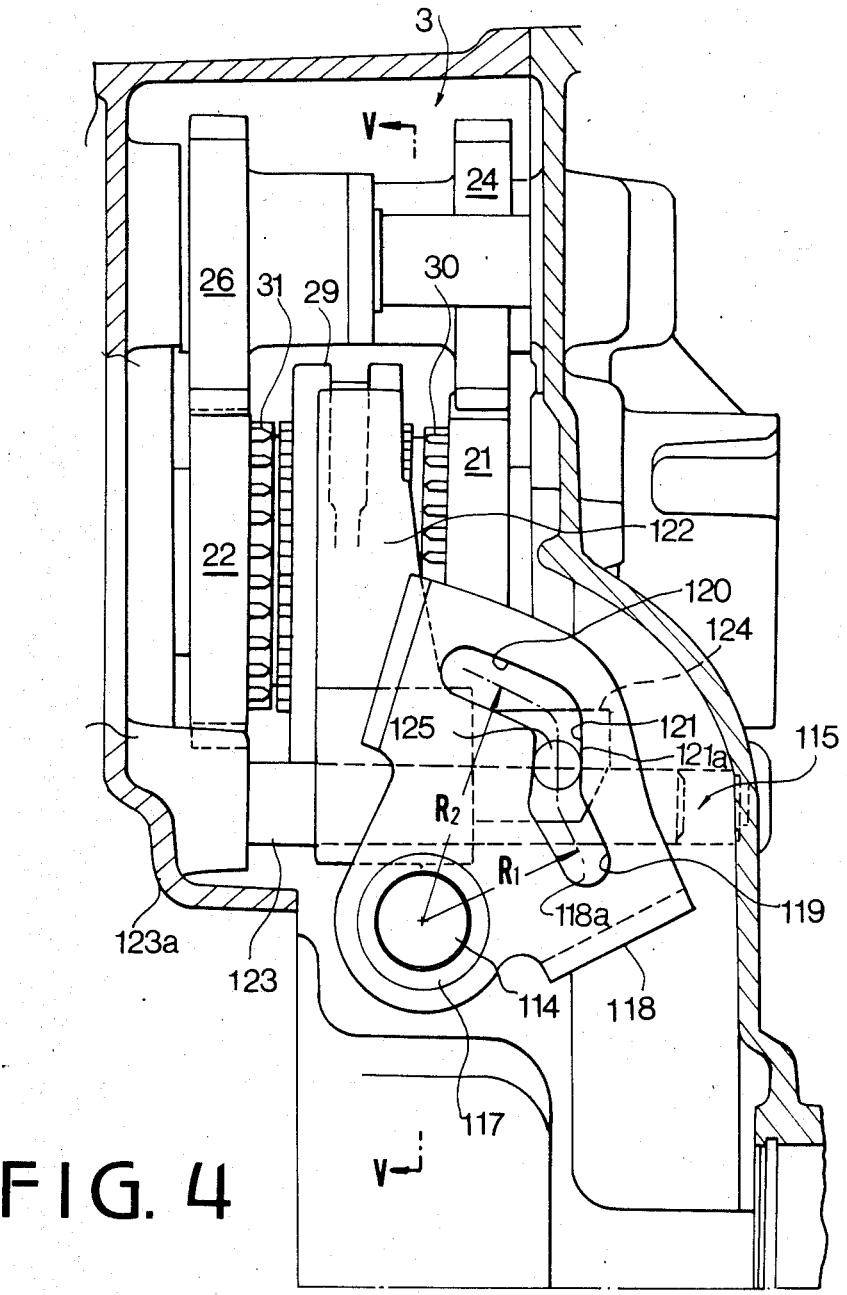
FIG. 4 is a sectional plan view as viewed from an arrow IV in FIG. 3.
Figure 5:
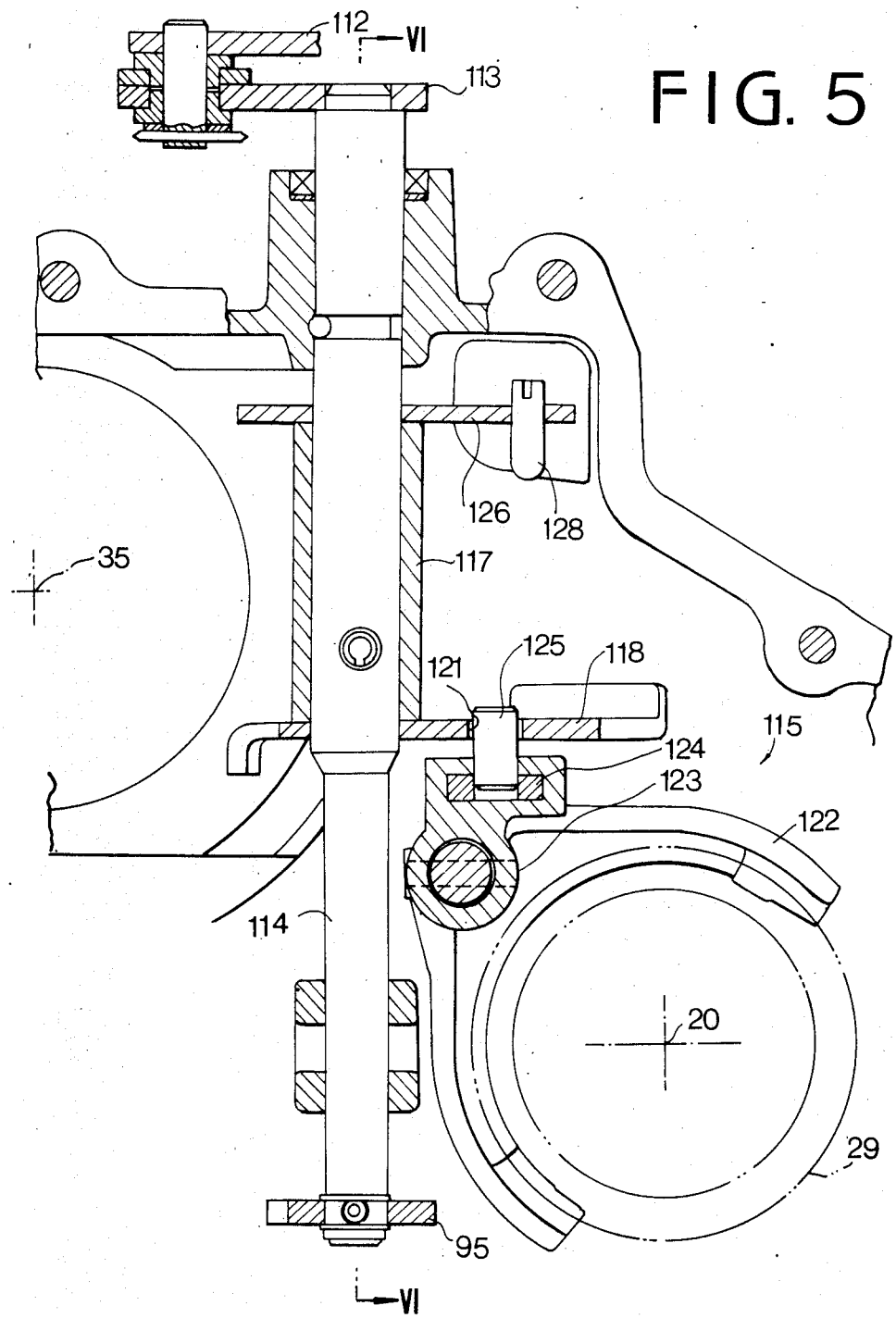
FIG. 5 is a sectional view taken along a line V—V in FIG. 4.

The mechanism of the present invention is hereinafter described referring to FIGS. 3 to 10. As shown in FIG. 3, the selector lever 110 is rotatably mounted on a shaft 110a and a lower end thereof is operatively connected to a vertical shaft 114 through a rod 111, and levers 112 and 113 so as to rotate the shaft 114. The vertical shaft 114 is positioned between the main shaft 20 and the output shaft 35 as shown in FIG. 5. A detent plate 126 having five indentations 126a is secured to the shaft 114 and a spring loaded positioning ball 127 engages with the detent plate so as to engage one of the indentations 126a in order to hold the shaft at a selected angular position.

At a middle position of the shaft 114, a synchronizer operating mechanism 115 is provided, a parking lock mechanism 116 and the cam 95 are provided at an upper portion and lower portion respectively.

The synchronizer operating mechanism 115 comprises a sleeve 117 secured to the shaft 114 and a cam plate 118 secured to the sleeve 117. The cam plate 118, as shown in FIG. 4, has a cam groove 118a comprising a first arcuate portion 119 having a small diameter $R_1$ about the axis of the shaft 114, a second arcuate portion 120 having a large diameter $R_2$ and an intermediate straight portion 121 connecting the first and second arcuate portions 119, 120. A fork 122 engaging with the sleeve 29 of the selector device 3 is secured to a slidable shaft 123 which is slidably mounted in a frame 123a (FIG. 4). The fork 122 has a projection 124 on which a cam follower 125 in the form of a roller 125a is provided. The cam follower 125 engages with the wall of the cam groove 118a.

Figures 10A, 10B:
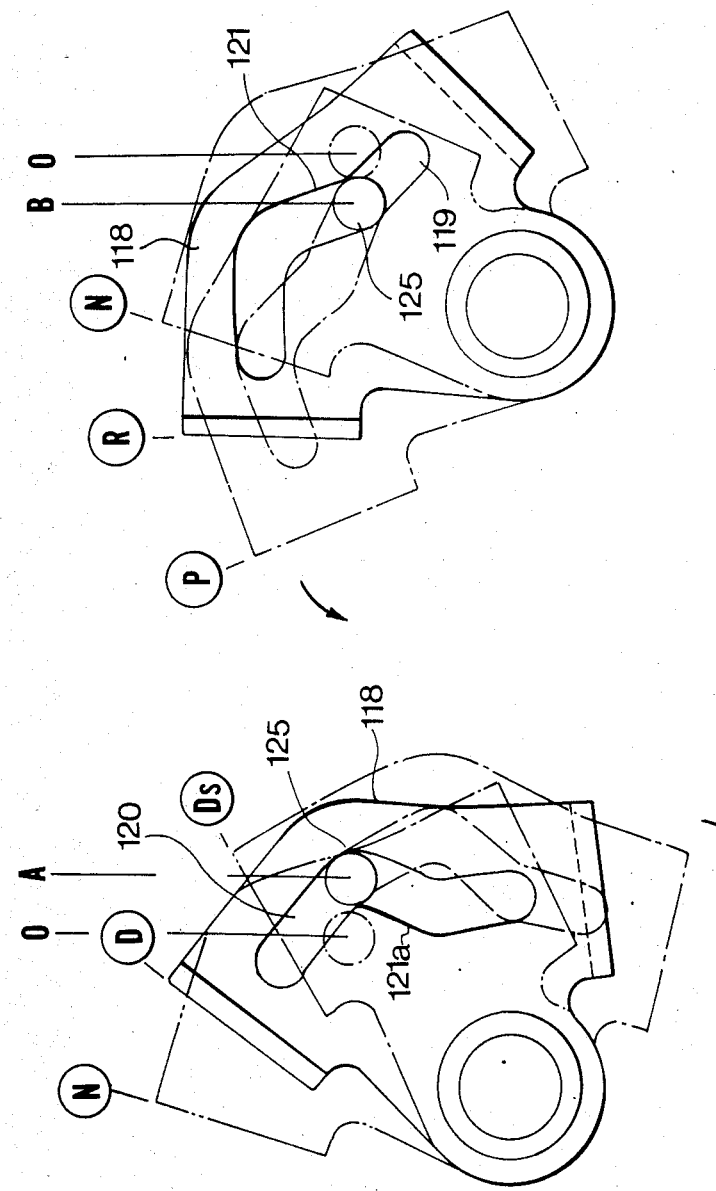
FIGS. 10a and 10b show the operation of a cam plate.

At the neutral position (N-range), the cam follower 125 is in the straight portion 121 as shown in FIG. 4. When the D-range is selected, the cam plate 118 rotates in the clockwise direction in FIG. 10a, and the cam follower 125 enters into the second arcuate portion 120 along an inside wall 121a. Thus the cam follower 125 is moved from a neutral position "O" to a D-range position "A" as shown in FIG. 10a. When the cam plate 118 is further rotated in the clockwise direction for selecting the Ds-range, the cam follower 125 does not move from the position "A". As shown in FIG. 10b, when the cam plate 118 is rotated in the counter-clockwise direction for the R-range, the cam follower 125 enters into the first arcuate portion 119, so that the cam follower is moved to a position "B". When the cam plate is further rotated to the P-range, the cam follower does not move.

Figure 6:
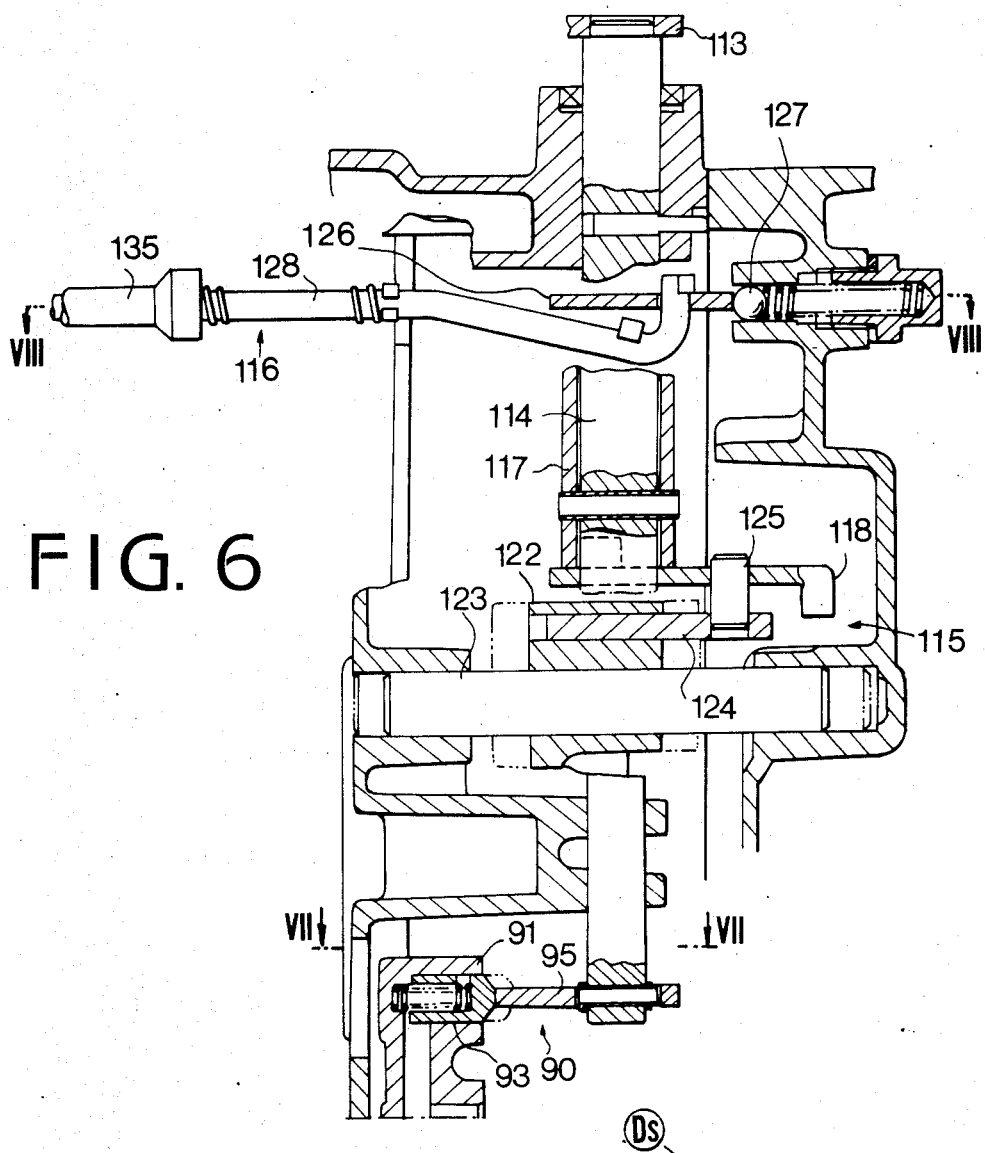
FIG. 6 is a sectional view taken along a line VI—VI in FIG. 5.
Figure 7:
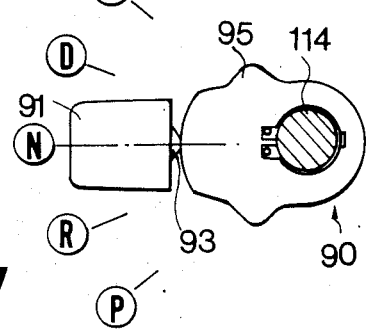
FIG. 7 is a sectional view taken along a line VII—VII in FIG. 6.
Figure 8:
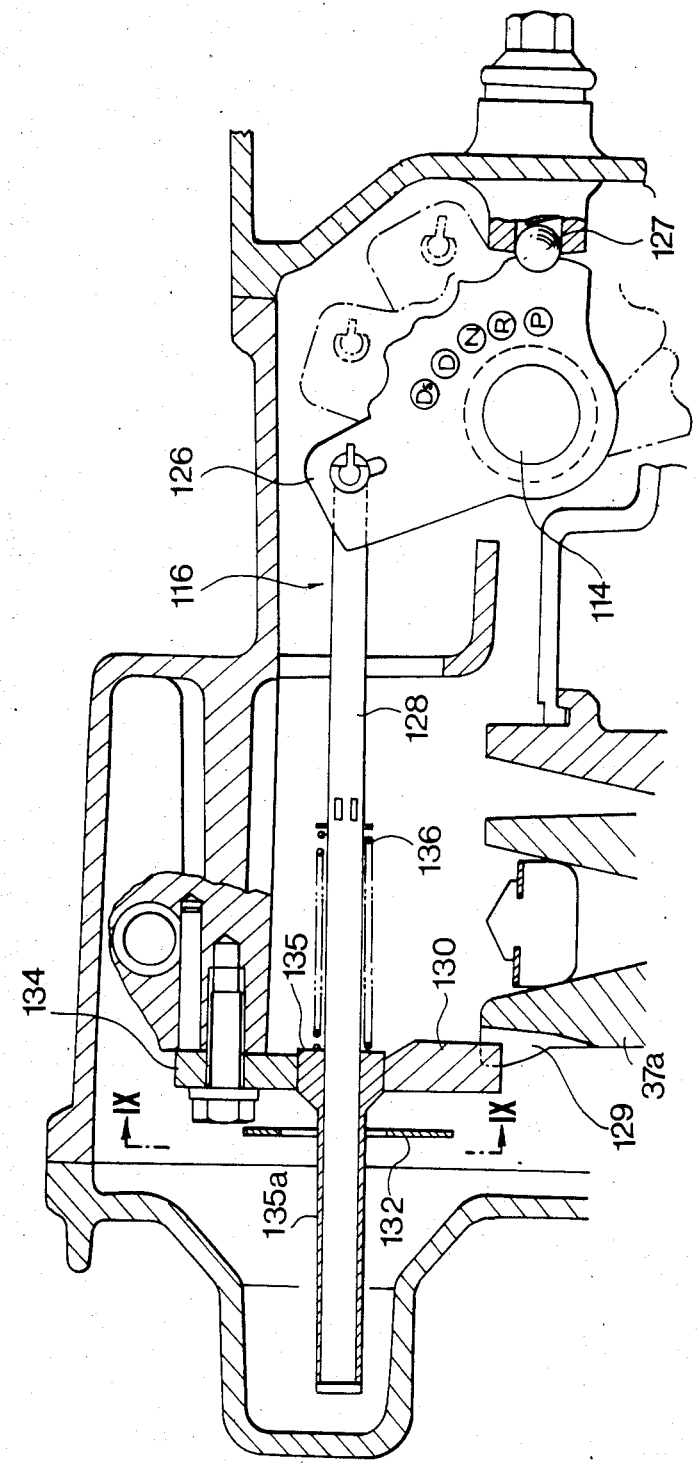
FIG. 8 is a sectional view taken along a line VIII—VIII in FIG. 6.
Figure 9:
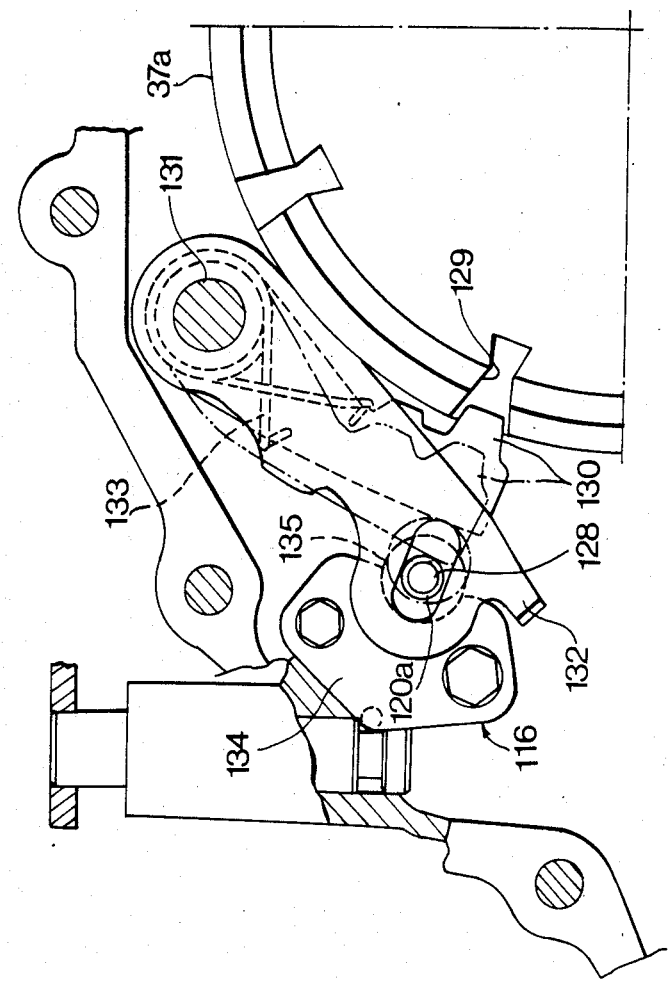
FIG. 9 is a sectional view taken along a line IX—IX in FIG. 8.

Referring to FIGS. 6, 8, and 9, the parking lock mechanism 116 comprises a rod 128 connected to the detent plate 126, and a parking pawl 130 rotatably mounted on a shaft 131 at a base end thereof and adapted to be engaged with one of notches 129 formed on the outside of the disc 37a of the driven pulley 37. A spring 133 provided between the pawl and a support plate 132 urges the pawl in the clockwise direction in FIG. 9, so that the back side of the pawl engages with a conical cam 135. The cam 135 has a cylindrical portion 135a which is slidably mounted on the rod 128 and biased by a spring 136 to the left in FIG. 8. Corresponding to the cam 135, a pusher plate 134 is secured to the frame so as to engage with the cam 135 to push the pawl to the disc 37a.

In operation, the shaft 114 is rotated by shifting the selector lever 110 along a straight line. When the Ds-range is selected from the D-range position "D" (FIG. 3), the cam plate 118 rotates in the clockwise direction, and the cam follower 125 is within the second portion 120 (FIG. 10a). Accordingly, the sleeve 29 is not shifted to keep the forward drive state. On the other hand, the valve 93 of the select position detecting valve 90 engages with the indentation 95b to open the drain aperture 92, so that the Ds-range is provided as described above. When the R-range is selected by shifting the selector lever 110, the cam plate 118 rotates in the counter-clockwise direction (FIG. 10b), and the cam follower 125 is shifted to the position "B", so that the sleeve 29 is moved to the left in FIG. 1 to engage the gear 22 with the main shaft 20 through the synchronizer 27. Thus, the reverse drive transmission system is provided.

When the P-range is selected, the shaft 114 further rotates in the counter-clockwise direction (FIG. 10b), and cam follower 125 remains at the R-range position. On the other hand, the rod 128 is located at the left-most position by the detent plate 126 as shown in FIG. 8, so that the cam 135 enters between the pusher plate 134 and pawl 130. Thus, the pawl 130 is rotated about the shaft 131 to be engaged with one of the notches 129 as shown in FIG. 9. If the pawl does not coincide with the notch 129, the cam 135 can not enter between the plate 134 and the pawl 130. Accordingly, the spring 136 is compressed to permit the movement of the rod 128. When one of the notches 129 coincides with the pawl 130 because of slight movement of the vehicle, the pawl engages with the notch to lock the disc 37a.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a selector mechanism for an infinitely variable belt-drive transmission for a vehicle, the transmission having a selector device comprising a synchronizer for selection of forward and reverse gears, and a hydraulic circuit for changing the transmission ratio of the transmission, the improvement comprising:

a selector lever mounted shiftably along a line so as to perform a selection of ranges including said forward and reverse gears;

a rotatable shaft operatively connected to the selector lever so as to be rotated by the selector lever;

a cam plate secured to the rotatable shaft and having a cam groove including a first arcuate portion and a second arcuate portion which are different in radii, and an intermediate portion between the first and second arcuate portions, the second arcuate portion corresponding to a drive range, and respectively, a high engine speed drive range for downshifting the transmission ratio during driving in the drive range, and the first arcuate portion corresponding to a reverse range and respectively a parking range;

cam follower means following the cam groove for operating the synchronizer; and a parking lock mechanism including a detent plate secured to the rotatable shaft and having a plurality of indentations, a spring-loaded ball engaging with one of the indentations for holding the rotatable shaft at a selected position, a first cam connected to the detent plate and a locking pawl on a housing of the transmission which are so arranged that when the parking range is selected, the first cam engages the pawl to engage the pawl with a rotatable member of the transmission so as to lock said member;

a second cam secured to the rotatable shaft; and means actuated by the second cam when the cam plate is rotated into a position corresponding to said high engine speed drive range for causing the hydraulic circuit to provide a high transmission ratio.

2. The selector mechanism as set forth in claim 1, wherein
   said cam follower means includes a fork engaging said synchronizer.

3. The selector mechanism as set forth in claim 2, wherein
   said synchronizer includes an axially displaceable sleeve engaging respective of said forward and reverse gears in respective displaced positions of said sleeve, said fork is connected to said sleeve for axially displacing said sleeve.

4. The selector mechanism as set forth in claim 3, wherein
   said fork is mounted so as to be axially displaceable corresponding to said sleeve, and
   said arcuate portions have their origins at the axis of said rotatable shaft, said cam follower means includes a cam follower on said fork engaging said groove.

5. The selector mechanism as set forth in claim 1, wherein said line is a straight line and said selector lever is mounted so as to be exclusively movable in a plane on which said line is located.

6. The selector mechanism as set forth in claim 5, wherein said selector lever is mounted so as to be pivotal in said plane, a lever arrangement comprising a two-arm lever pivoted at a center thereof to a one-arm lever and connected to another one-arm lever, the latter being secured to said rotatable shaft, a rod pivotally connected to a lower end of said selector lever and to said two-arm lever.

7. The selector mechanism as set forth in claim 1, wherein said line is arranged with a neutral range at a center, the drive and the high engine speed drive ranges at one side of the center and the reverse and parking ranges at another side of the center.

* * * * *